US010311056B2

(12) United States Patent
Kong et al.

(10) Patent No.: US 10,311,056 B2
(45) Date of Patent: Jun. 4, 2019

(54) ENERGY MANAGEMENT SYSTEM

(71) Applicant: LSIS CO., LTD., Gyeonggi-do (KR)

(72) Inventors: Shin-Jo Kong, Gyeonggi-do (KR); Jong-Ho Park, Gyeonggi-do (KR); Myung-Hwan Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 254 days.

(21) Appl. No.: 15/221,914

(22) Filed: Jul. 28, 2016

(65) Prior Publication Data

US 2017/0031991 A1 Feb. 2, 2017

(30) Foreign Application Priority Data

Jul. 29, 2015 (KR) .................. 10-2015-0107565

(51) Int. Cl.
| | |
|---|---|
| *G06F 16/00* | (2019.01) |
| *G06F 16/2455* | (2019.01) |
| *G06F 16/28* | (2019.01) |
| *G06Q 10/06* | (2012.01) |
| *G06Q 10/10* | (2012.01) |
| *G06Q 50/06* | (2012.01) |
| *G05B 15/02* | (2006.01) |

(52) U.S. Cl.
CPC ......... *G06F 16/2455* (2019.01); *G05B 15/02* (2013.01); *G06F 16/282* (2019.01); *G06Q 10/06* (2013.01); *G06Q 10/10* (2013.01); *G06Q 50/06* (2013.01); *G05B 2219/25061* (2013.01)

(58) Field of Classification Search
CPC ................................. G06F 17/30477
See application file for complete search history.

(56) References Cited

U.S. PATENT DOCUMENTS

| 4,961,139 A | * | 10/1990 | Hong ...................... G06F 17/30 |
| 6,356,920 B1 | * | 3/2002 | Vandersluis ...... G06F 17/30389 |
| | | | 707/E17.125 |
| 2011/0082596 A1 | * | 4/2011 | Meagher ............... H02J 13/001 |
| | | | 700/291 |

(Continued)

FOREIGN PATENT DOCUMENTS

| CN | 103049826 A | 4/2013 |
| CN | 103825279 A | 5/2014 |

(Continued)

OTHER PUBLICATIONS

Search report issued in corresponding European application No. 16175296.9-1958 dated Aug. 26, 2016.

(Continued)

*Primary Examiner* — Apu M Mofiz
*Assistant Examiner* — Farhad Agharahimi
(74) *Attorney, Agent, or Firm* — K&L Gates LLP

(57) ABSTRACT

Disclosed embodiments relate to data management apparatuses and methods of an energy management system. In some embodiments, the data management apparatus includes: a control unit configured to process data collected from a power system; and a real-time database composed of the processed data. The control unit may receive an input for entry selection for data inquiry on the real-time database irrespective of a hierarchy of a data entry and inquire data from the real-time database based on the received input.

4 Claims, 5 Drawing Sheets

PRIOR ART

(56) References Cited

U.S. PATENT DOCUMENTS

2015/0066947 A1  3/2015 Lee et al.

FOREIGN PATENT DOCUMENTS

| | | |
|---|---|---|
| EP | 2 857 994 A1 | 4/2015 |
| JP | H09251470 A | 9/1997 |
| JP | 2006252255 A | 9/2006 |
| JP | 2009003549 | 1/2009 |
| KR | 100964298 B1 | 6/2010 |
| KR | 20120053231 A | 5/2012 |
| KR | 20120108208 A | 10/2012 |
| KR | 101484186 B1 | 1/2015 |

OTHER PUBLICATIONS

Chinese Office Action for related Chinese Application No. 201610592951.1; action dated Feb. 11, 2019; (6 pages).

* cited by examiner

PRIOR ART

PRIOR ART

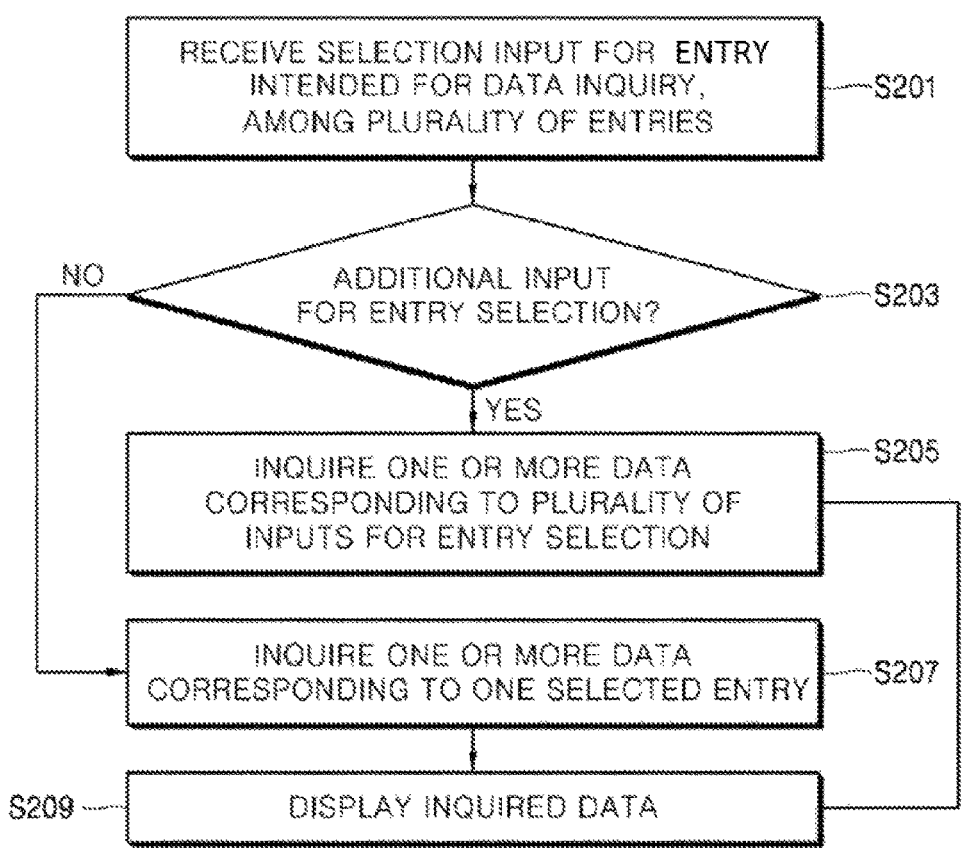

ENERGY MANAGEMENT SYSTEM

CROSS REFERENCE TO RELATED APPLICATIONS

This application claims the benefit of Korean Patent Application No. 10-2015-0107565, filed on Jul. 29, 2015 and entitled "ENERGY MANAGEMENT SYSTEM", which is hereby incorporated by reference in its entirety.

BACKGROUND

Technical Field

The present disclosure relates to an energy management system and more particularly, to an apparatus and method which is capable of allowing a user to easily retrieve data values stored in an energy management system.

Description of the Related Art

Under circumstances of increased government regulation for improvement of energy efficiency and reduction of greenhouse gas, increased burden on energy costs, insufficient supply of power, and so on, there is a rising interest in reducing energy consumption and improving energy efficiency. Although the reduction of energy consumption requires measures which are systematic, sustainable and effective, satisfactory means have not been suggested until now. Therefore, for the purpose of reduction of energy consumption, there is a need of powerful means for determining where and how much energy is consumed, discovering factors of energy dissipation, and finding and fulfilling improvement plans.

As such means, an energy management system (EMS) capable of monitoring and controlling a flow of energy is receiving the global spotlight. The energy management system is an integrated energy management solution capable of optimizing energy consumption by monitoring situations of energy consumption in real time and analyzing an aggregation of data based on hardware, software and ICT-based monitoring and control techniques.

The existing energy management systems had inconveniences in data inquiry using a real-time database, as will be described below with reference to FIGS. 1 and 2.

FIG. 1 is a view illustrating the configuration of data management of a conventional energy management system.

In the conventional energy management system, when the system is started, a control unit 12 fetches schema information and a database file included in a database 11. Accordingly, in order to inquire (or retrieve) real-time data, a user has to inquire a server 10 in which the database 11 is working. Specifically, the user has to access the control unit 12 of the server 10 in which the real-time data are residing.

FIG. 2 is a flow chart illustrating a data managing process of the conventional energy management system.

A current database included in the energy management system is a real-time database. Therefore, the energy management system receives an input of entry selection intended for data inquiry (S101). Specifically, a plurality of entries for data inquiry may be present. In addition, the data inquiry in the energy management system requires a selection for the plurality of entries. Real-time data are managed by means of a pointer rather than the form of a table and, therefore, there is a need to select an entry corresponding to the pointer.

Upon receiving an input of entry selection, the energy management system receives an input to select a sub entry of a selected entry (S103). An entry for data inquiry may have a hierarchal structure. Therefore, the energy management system can receive a selection input for each of hierarchal structures for correct data inquiry.

As one example, the energy management system receives an input to select one of entries in the order of Vector, Method, Item, ItemData and Array. If the uppermost entry is Vector, the energy management system receives a selection input for Method associated with the selected Vector. In this way, the energy management system can receive the selection input sequentially up to the last sub entry.

The energy management system inquires one data for the selected entry (S105).

The conventional energy management system has the above-described problem. One embodiment of the present disclosure capable of overcoming this problem will be hereinafter described in detail.

SUMMARY

It is an aspect of some embodiments of the present disclosure to provide an energy management system which is capable of managing real-time data with high efficiency by enhancing a real-time data inquiry function. In some embodiments, "data inquiry" can be is synonymous with "data retrieval."

It is another aspect of some embodiments of the present disclosure to provide an energy management system which is capable of allowing a client to inquire data which could be inquired only by a server in the existing art.

It is another aspect of some embodiments of the present disclosure to provide an energy management system which is capable of inquiring one or more data on one screen.

It is another aspect of some embodiments of the present disclosure to provide an energy management system which is capable of inquiring important data at one click.

In accordance with one aspect of some embodiments of the present disclosure, there is provided a data management apparatus of an energy management system, including: a control unit configured to process data collected from a power system; and a real-time database composed of the processed data, wherein the control unit receives an input for entry selection for data inquiry on the real-time database irrespective of a hierarchy of a data entry and inquires data from the real-time database based on the received input.

In some embodiments, upon receiving an input to select only an entry of a first hierarchy among entries for data inquiry, the control unit may determine all of entries corresponding to a second hierarchy next to the first hierarchy, as inquiry targets.

In some embodiments, the control unit may display a menu to ask whether to select all of entries corresponding to the second hierarchy.

In some embodiments, the control unit may receive an input for at least one filtering condition and filter and display data inquired based on the received filtering condition.

In some embodiments, the control unit may transform a result of the data inquiry into a file and stores the file.

In some embodiments, information of the selected entry may include at least one of name, type and the number of sub entries of the selected entry.

According to some embodiments of the present disclosure, it is possible to provide an energy management system which is capable of managing real-time data with high efficiency by enhancing a real-time data inquiry function.

According to some embodiments of the present disclosure, it is possible to provide an energy management system which is capable of allowing a client to inquire data which could be inquired only by a server in the existing art.

According to some embodiments of the present disclosure, it is possible to provide an energy management system which is capable of inquiring one or more data on one screen.

According to some embodiments of the present disclosure, it is possible to provide an energy management system which is capable of inquiring important data at one click.

BRIEF DESCRIPTION OF DRAWINGS

FIG. 5 is a flow chart illustrating an operating process of an energy management server according to some embodiments of the present disclosure.

DETAILED DESCRIPTION

Figure 1:
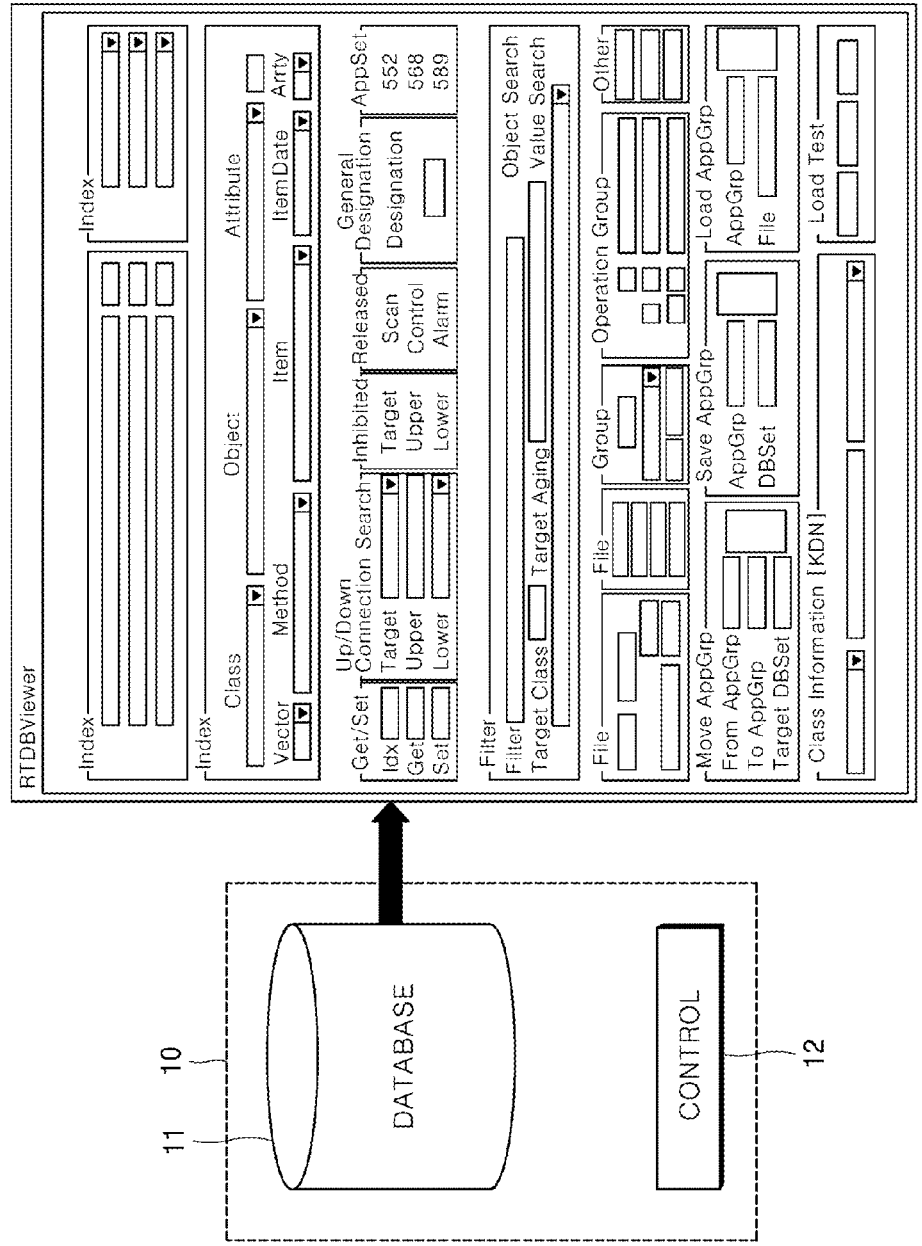
FIG. 1 is a view illustrating the configuration of data management of a conventional energy management system, according to the prior art.

Hereinafter, embodiments of the present disclosure will be described in detail with reference to the accompanying drawings. It should be understood that the present disclosure is not limited to the following embodiments, and that some embodiments are provided for illustrative purposes only. The scope of the disclosure should be defined only by the accompanying claims and equivalents thereof.

In the following description, the terms "module" and "unit," which are suffixes for elements, are given or used alone or in combination for the purpose of facilitating the description, but these terms are not intended to make a distinction between both.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow chart. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products comprising instruction means for performing the functions described in the blocks in the drawings or in the steps in the flow chart. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow chart.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

An energy management system according to some embodiments of the present disclosure uses a real-time database to store and manage data. Unlike the general relational database, the real-time database may be constructed by Class, Object and Attribute and may include detailed data such as Item, Vector, ItemData and Array. The general relational database may express data into the form of a table rather than a hierarchal structure and freely access items in square. In addition, a user can freely make division, combination, addition and modification of the table without being affected by other factors.

However, the energy management system is forced to use a real-time database instead of the general relational database since data include to be continuously processed and stored in real time. The real-time database can access data through a pointer associating data with data. Therefore, the conventional energy management systems had an inconvenience in that only one data is inquired at once data inquiry.

Hereinafter, some embodiments of the present disclosure will be described with reference to the drawings.

Figure 3:
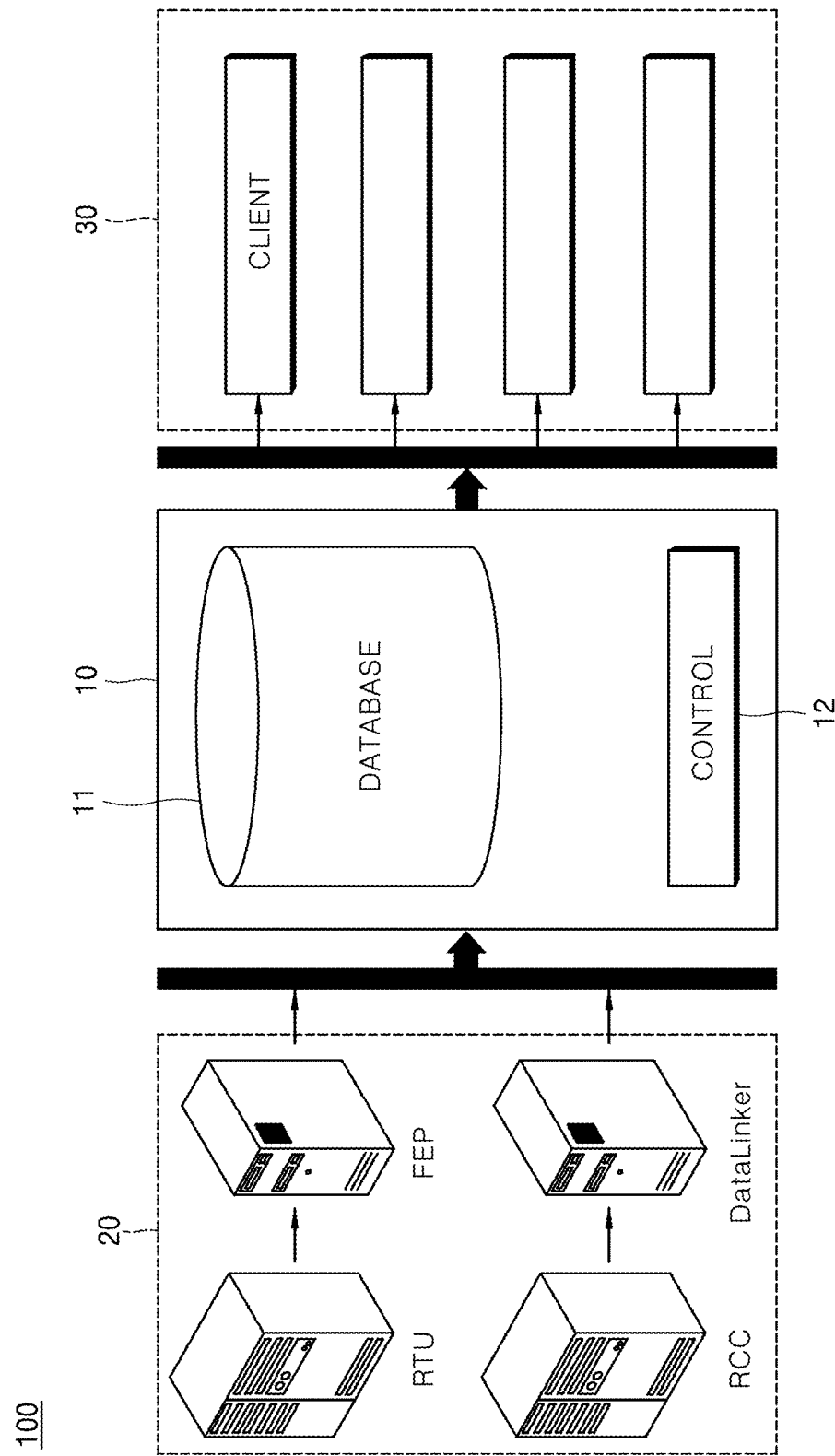
FIG. 3 is a block diagram illustrating the configuration of an energy management system according to some embodiments of the present disclosure.

FIG. 3 is a block diagram illustrating the configuration of an energy management system according to some embodiments of the present disclosure.

Referring to FIG. 3, an energy management system according to some embodiments of the present disclosure may include an energy management server 10, a client 30 and a power system 20.

The energy management server 10 can receive data from the power system 20 and create the data in the form of a database 11. In addition, the energy management server 10 can provide the database 11 to the client 30. In addition, the energy management server 10 can manage and control the power system 20. The energy management server 10 may be connected to a plurality of clients 30. In addition, the energy management server 10 may include a dual structure.

The energy management server 10 may include the database 11 and a control unit 12.

The database 11 can collect/store measurement data received from the power system 20 and store operational data based on the measurement data for each predetermined period. In addition, the database 11 can automatically create and store a list of measurement and operational data and store a list of policy data.

The control unit 12 can control the overall operation of the energy management server 10. In some embodiments, the control unit 12 can create the database 11 by processing data delivered from the power system 20. In other embodiments, the control unit 12 can provide specified data to the client 30 at a request from the client 30.

Figure 2:
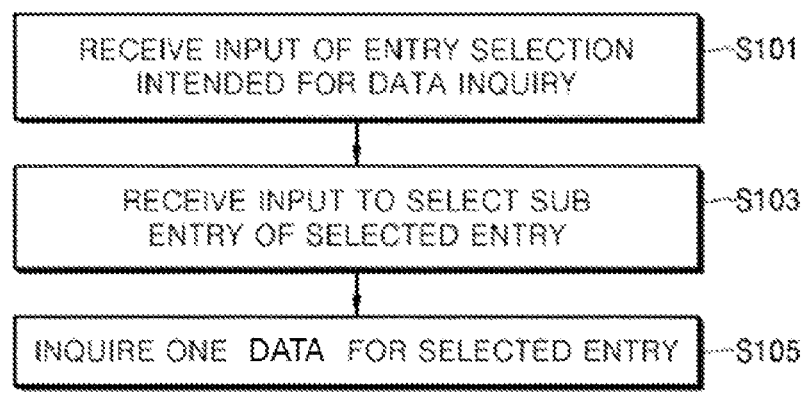
FIG. 2 is a flow chart illustrating a data managing process of the conventional energy management system, according to the prior art.

As described previously with reference to FIGS. 1 and 2, the conventional real-time data inquiry function is only to make an inquire of a server in which a real-time database is residing. In addition, since only one data or point value is inquired by once inquiry, efficiency of inquiry is low. In addition, since there is no function of storing the inquired data separately, there is a trouble of performing a storage operation separately after the inquiry.

Therefore, some embodiments of the present disclosure capable of improving the conventional data management function will be described below with reference to FIGS. 4 and 5.

Figure 4:
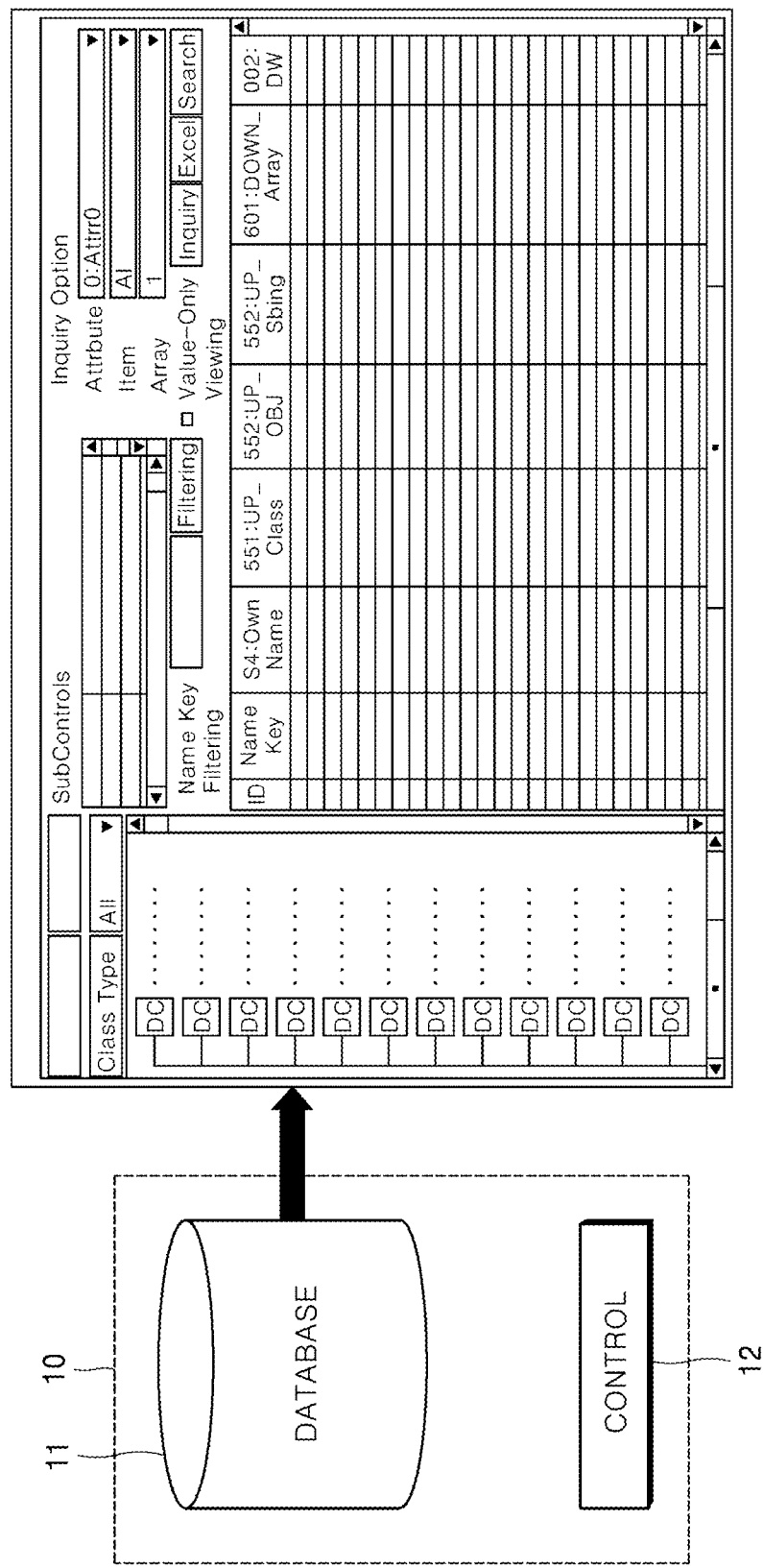
FIG. 4 is a view illustrating data management in the energy management system according to some embodiments of the present disclosure.

FIG. 4 is a view illustrating data management in the energy management system according to some embodiments of the present disclosure. The energy management server 10 illustrated in FIG. 4 may also be referred to as a data management apparatus of the energy management system.

Some embodiments of the present disclosure will now be described with the contents shown in FIG. 4. First, the control unit 12 of the energy management server 10 receives an input to select a desired class from a class tree in the left side. In this case, since all objects included in the selected class are inquired, there is no need to receive a selection input for an object separately. In other words, upon receiving only an input for one hierarchy, the control unit 12 can determine all items corresponding to a hierarchy next to the one hierarchy, as inquiry targets.

In addition, upon receiving an input to select an attribute, the control unit 12 can display a menu to ask a user whether to inquire items belonging to the attribute, all or partially. At this time, the classes, objects, attributes and items may be entries for each hierarchy for data inquiry.

At this time, the control unit 12 can display a menu for data inquiry through a display device included in the energy management system. In addition, the control unit 12 can also display a menu for data inquiry through a display device included in the client 30.

In the meantime, in some embodiments of the present disclosure, a menu screen for data inquiry may be configured as illustrated in FIG. 4. Specifically, the menu screen for data inquiry can display a data entry in the left side. Upon receiving a selection for a data entry from a user, the control unit 12 can additionally display a sub entry of the entry.

In addition, an additional function may be displayed in the top of the menu screen for data inquiry. In this case, the additional function may include at least one of a filtering function, a value-only viewing function and a brief information display function of an entry currently selected. The brief information may include at least one of entry name, entry type and the number of sub entries.

In addition, the menu screen for data inquiry may display a result of inquiry in the bottom. The menu screen can be created by the control unit 12 and the client 30 can receive a signal associated with the creation and display the signal through a display device.

In addition, the control unit 12 may display a menu to ask the user whether to inquire array entries, all or partially.

The control unit 12 inquires data according to the above-described input. At this time, the control unit 12 can inquire data from the database 11 residing in the system. In addition, the control unit 12 can receive one or more filtering conditions from the user and display only values of an object desired by the user based on the filtering condition.

On the one hand, upon receiving an input to display only some values from the user, the control unit 12 can display only values according to the input, of the inquired data. In addition, the control unit 12 can transform the inquired data into a different type of file to be stored in the energy management server 10. The type of file to be stored at this time may be an Excel file.

The input received by the control unit 12 may be a user input received from the client 30.

FIG. 5 is a flow chart illustrating an operating process of the energy management server according to some embodiments of the present disclosure.

The control unit 12 of the energy management server 10 displays a plurality of entries for data inquiry on the menu screen and receives an input for an entry for which data inquiry is desired, from the user (S201). At this time, the control unit 12 can display the plurality of entries for data inquiry on a screen of the client 30. The plurality of entries displayed by the control unit 12 may be one form of user interface.

In addition, the control unit 12 can receive an input through a user's click or key input for an entry displayed on the screen. In other words, the control unit 12 can receive a user input to the user interface. For example, the control unit 12 can receive an input to click on one of the plurality of entries through the user interface.

Upon receiving an initial input, the control unit 12 determines whether or not there is an additional input for entry selection (S203). When one entry is selected, the selected entry may include sub entries and, therefore, the control unit 12 can determine whether or not there is an input of selection for one of the sub entries.

In some embodiments, when there is an additional input of entry selection, the control unit 12 inquires one or more data corresponding to the plurality of inputs for entry selection (S205).

In some embodiments, when there is no additional input of entry selection, the control unit 12 inquires one or more data corresponding to the one selected entry (S207).

In some embodiments, when one entry is selected, if the selected entry includes sub entries, the control unit 12 can always display an interface for sub entry selection.

The data management apparatus of the energy management system according to some embodiments of the present disclosure can select an entry irrespective of a hierarchy of an item and can inquire one or more data even if all entries are not selected. At this time, the data management apparatus may be one unit of the energy management server 10.

The control unit 12 displays the inquired data. In some embodiments, the control unit 12 may transmit the inquired data to the client 30 and display the data on a display included in the client 30.

Upon completing the data inquiry, the control unit 12 can return to Step S201 to wait an inquiry input from the user. In some embodiments, the control unit 12 can always display an interface for data inquiry input. In some embodiments, the control unit 12 can display an interface for data inquiry input only when there is a separate input.

The data management apparatus of the energy management system according to some embodiments of the present disclosure can provide a user interface to allow a user to inquire a variety of data with minimal operation.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of some embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data management apparatus of an energy management system, comprising:
    a control unit further comprising a processor, configured to process data collected from a power system; and
    a real-time database configured to store the processed data,
    wherein the control unit is further configured to:
    display a first menu screen on a display device of a client, wherein the first menu screen includes entries for data retrieval from the real-time database irrespective of a hierarchy of data entry of the real-time database;
    receive an input to select an entry of a first hierarchy of the real-time database for data retrieval by the client;
    determine entries corresponding to a second hierarchy next to the first hierarchy as retrieval targets;
    display a second menu screen on the display device to select whether data retrieval should include all retrieval targets belonging to the second hierarchy; and
    display all of the entries determined to be retrieval targets when receiving an input via the second menu screen that data retrieval should include all retrieval targets belonging to the second hierarchy.

2. The data management apparatus according to claim 1, wherein the control unit is further configured to receive an input for at least one filtering condition filter the retrieval targets based on the received filtering condition, and display the filtered retrieval targets.

3. The data management apparatus according to claim 1, wherein the control unit is further configured to transform a result of the data retrieval into a file and store the file.

4. The data management apparatus according to claim 1, wherein information of the selected entry includes at least one of a name, a type, or a number of sub entries of the selected entry.

* * * * *